Patented July 21, 1925.

1,547,102

UNITED STATES PATENT OFFICE.

GUILLAUME DE MONTMOLLIN AND JOSEF SPIELER, OF BASEL, SWITZERLAND, ASSIGNORS TO THE SOCIETY OF CHEMICAL INDUSTRY IN BASLE, OF BASEL, SWITZERLAND.

CARBONYL DERIVATIVE OF ALPHA NAPHTHOL AND PROCESS OF MAKING THE SAME.

No Drawing. Application filed April 10, 1923. Serial No. 631,192.

*To all whom it may concern:*

Be it known that we, GUILLAUME DE MONTMOLLIN and JOSEF SPIELER, both citizens of the Swiss Republic, and residents of Basel, Switzerland, have invented a new and useful Carbonyl Derivative of Alpha Naphthol and Process of Making the Same, of which the following is a full, clear, and exact specification.

This is a continuation in part of our U. S. Letters Patent No. 1,474,928, granted Nov. 20, 1923.

We have now found that when the above process is carried out in presence of an aliphatic alcohol, containing from two to five atoms of carbon, there is obtained besides the said dyestuffs a further new carbonyl derivative of alphanaphthol, the 4,4'-dihydroxy-1,1'-dinaphthylketone of the formula:

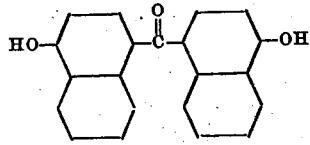

which constitutes nearly uncolored crystals melting at 243° C. and dissolves in solution of caustic alkalies and of alkali carbonates with yellow coloration, and which can be isolated from the reaction mass owing to its solubility in the organic solvents and its behaviour toward bases and acids.

This new product can be employed for the manufacture of dyestuffs and of intermediate products for the manufacture of dyestuffs.

*Example.*

144 parts of alphanaphthol are dissolved in a mixture of 400 parts of a solution of caustic soda of 40% and of 1200 parts of ethyl alcohol. Then there are added 154 parts of carbon tetrachloride and 1 part of copper powder and the whole is stirred for several hours, while cooling in such a manner that the temperature of the mass of reaction does not rise over 50° C. After the achievement of the reaction, the intense blue-green liquid is acidified with a mineral acid, the inorganic salts precipitated are filtered off, and the alcohol is distilled off.

The residue thus obtained is digested with a hot dilute solution of sodium carbonate and the liquid is decanted after cooling, and out of the solution thus obtained, the 4,4'-dihydroxy-1,1'-dinaphthylketone is isolated by acidifying. It is purified by dissolution in glacial acetic acid.

It is also advantageous to use amyl alcohol in place of ethyl alcohol.

What we claim is:—

1. The herein described process for the manufacture of a new carbonyl derivative of alphanaphthol, the 4,4'-dihydroxy-1,1'-dinaphthylketone of the formula:

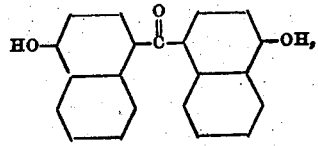

consisting in reacting with a tetrahalogen derivative of methane on alphanaphthol in presence of substances capable of neutralizing acids and of an aliphatic alcohol containing from two to five atoms of carbon.

2. As a new article of manufacture the herein described 4,4'-dihydroxy-1,1'-dinaphthylketone constituting nearly uncolored crystals melting at 243° C. dissolving in solutions of caustic alkalies and of alkali carbonates with yellow coloration and corresponding to the formula:

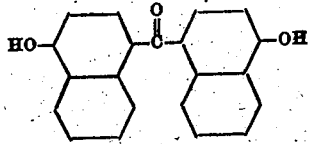

In witness whereof we have hereunto signed our names this 26th day of March 1923, in the presence of two subscribing witnesses.

GUILLAUME DE MONTMOLLIN.
JOSEF SPIELER.

Witnesses:
AMAND RITTER,
AMAND BRAUN.